United States Patent [19]

Bonzak

[11] Patent Number: 5,287,762
[45] Date of Patent: Feb. 22, 1994

[54] RECIRCULATING BALL NUT AND SHAFT ASSEMBLY

[75] Inventor: Michael J. Bonzak, Bay City, Mich.

[73] Assignee: Thomson Saginaw Ball Screw Company, Inc., Saginaw, Mich.

[21] Appl. No.: 22,717

[22] Filed: Feb. 24, 1993

Related U.S. Application Data

[63] Continuation-in-part of Ser. No. 812,747, Dec. 23, 1991, Pat. No. 5,199,169.

[51] Int. Cl.$^5$ ............................................. F16H 25/22
[52] U.S. Cl. .............................. 74/424.8 R; 74/89.15; 74/459
[58] Field of Search .............. 74/424.8 R, 89.15, 459; 192/138, 139, 141; 29/898.03, 898.07, 402.18, 458, 527.1, 527.2, DIG. 1

[56] References Cited

U.S. PATENT DOCUMENTS

| | | | |
|---|---|---|---|
| 3,029,660 | 4/1962 | Spears | 74/424.8 R |
| 3,171,296 | 3/1965 | Chemel | 74/424.8 R |
| 3,546,930 | 12/1970 | Flarsheim | 74/459 X |
| 3,656,358 | 4/1972 | Kopp | 74/459 X |
| 4,637,272 | 1/1987 | Teske et al. | 74/424.8 R |
| 4,671,325 | 6/1987 | Otter | 138/30 |
| 4,905,533 | 3/1990 | Benton et al. | 74/459 |
| 4,938,090 | 7/1990 | Brusasco | 74/459 X |
| 5,104,005 | 4/1992 | Schneider, Jr. et al. | 74/424.8 R |

FOREIGN PATENT DOCUMENTS

| | | |
|---|---|---|
| 671403 | 10/1963 | Canada . |
| 0123589 | 10/1984 | European Pat. Off. . |
| 2852179 | 6/1980 | Fed. Rep. of Germany . |
| 541608 | 10/1955 | France . |
| 1403593 | 8/1975 | United Kingdom ........... 74/424.8 R |

Primary Examiner—Mark Rosenbaum
Assistant Examiner—S. Thomas Hughes
Attorney, Agent, or Firm—Learman & McCulloch

[57] ABSTRACT

A method of making recirculating ball nut and threaded shaft, and race and splined shaft assemblies comprising, cutting the grooved shaft to desired length, relatively moving the shaft and ball nut or race to cause the nut or race to move over the end of the shaft and axially along it to a location removed from the terminal end of the shaft, selecting a pre-machined shaft end component having an external bearing surface of the required size for the diameter and length of shaft which has been cut, and having a sleeve with internal groove and land portions, coating at least one of the grooved portions of the pre-machined shaft end component and the one end of the shaft with a hardenable adhesive, relatively moving the pre-machined shaft end component and shaft to cause the sleeve to move over the terminal end of the shaft and axially along the shaft to dispose the pre-machined end component on the shaft with its sleeve covering the adhesive, and curing the adhesive to form an integrated axially extending key between the pre-machined shaft end component and shaft. The invention is further concerned with the product so formed.

8 Claims, 2 Drawing Sheets

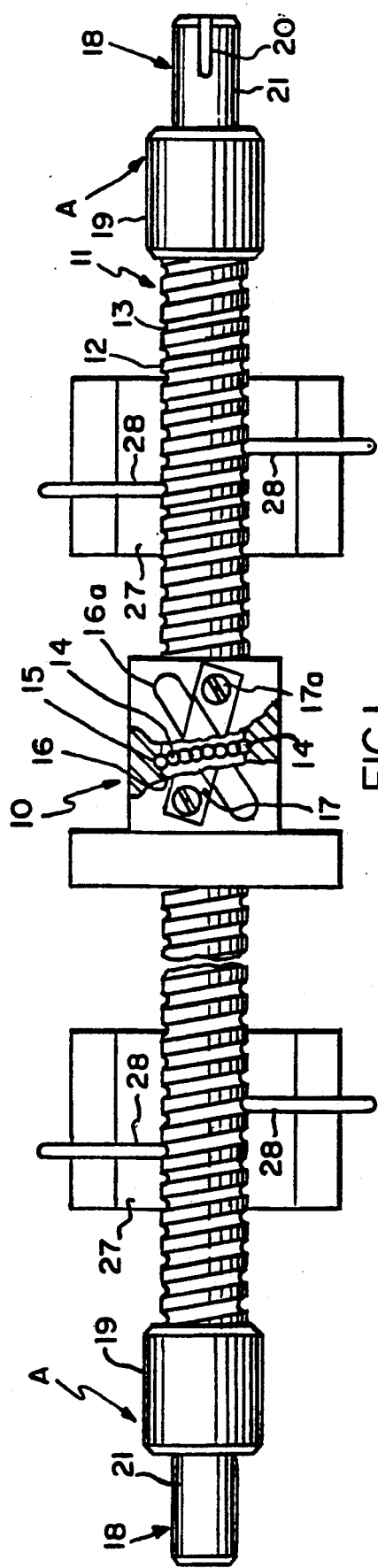
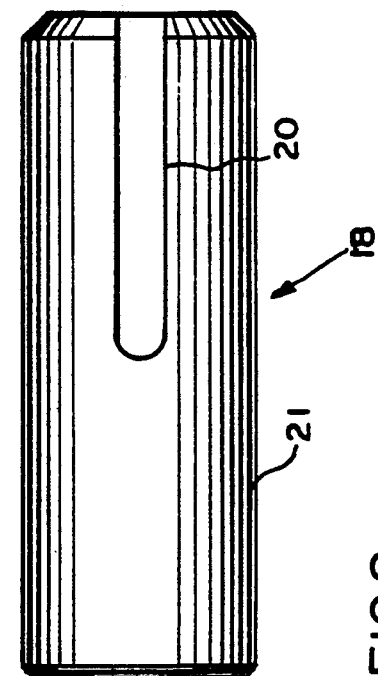
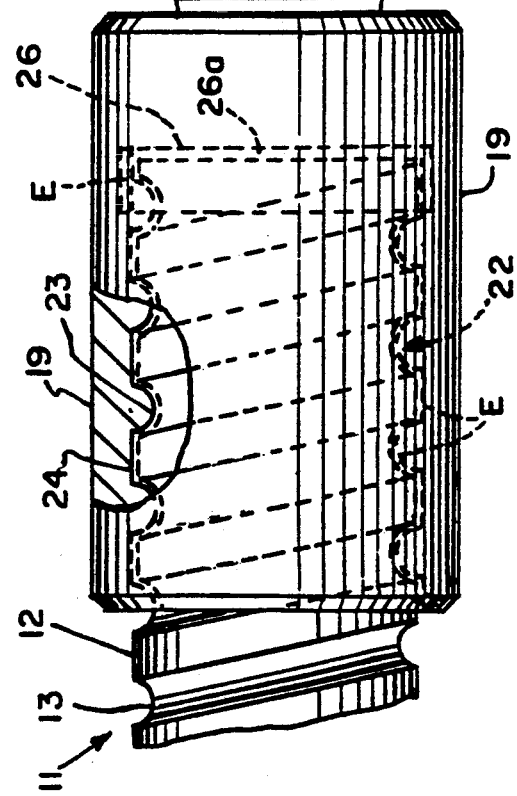

RECIRCULATING BALL NUT AND SHAFT ASSEMBLY

The application is a continuation-in-part of application Ser. No. 07/812,747, filed Dec. 23, 1991, now U.S. Pat. No. 5,199,169.

BACKGROUND OF THE INVENTION

This invention relates to recirculating ball nut and screw or splined shaft assemblies which comprise an externally grooved, ball-accommodating shaft with a complementally internally grooved nut having a circuit for precision bearing balls which recirculate in the grooved parts. More particularly, it is concerned with methods of providing bearing ends for the shafts of such assemblies, with some of the bearing ends incorporating a drive attachment or coupling configuration. The invention is further concerned with the products formed by practicing the method.

Previously, bearing surfaces and drive configuration surfaces of the required diameter and type have been machined on demand, and to specification, on the ends of the grooved shaft at the time of machining the shaft in the factory, and the assemblies have been then marketed in finished form. Some time has been required to prepare the drawings or specifications necessary to place such orders, schedule them in the factory for production, produce them, and ship them.

One of the prime objects of the present invention is to provide a method which permits the customer, or the customer's assembler, to more quickly provide the required end configurations for various diameter grooved shafts of the desired length. The concept envisions the production of pre-machined ends at the factory in a variety of standard sizes and configurations which can be inventoried and ordered to suit the particular length of grooved shaft to be used with a given ball nut. The method of fabricating to be described dramatically shortens the time required for the production of a recirculating ball nut and screw assembly from days to hours.

Still another object of the invention is to provide a method of making a ball nut and screw assembly, having finish-machined driver or bearing ends of the required size and configuration, which can be performed by customers with no access to precision turning or grinding machinery to provide the particular shaft ends which are required for a particular ball nut and screw assembly to function.

A further object of the invention is to provide a very economical method of fabricating ball nut and screw or splined shaft assemblies which can be performed on site by relatively unskilled work crews using only very simple and readily available hardware.

Still another object of the invention is to provide a method for forming a recirculating ball nut and screw or splined shaft assembly of the character described which provides an assembly with the required precision without undue expense and with reliability.

A still further object of the invention is to provide an assembly of the character defined which operates with efficiency, and which has a predictable service life and requires little or no maintenance.

Applicant is aware of the following listed patents which applicant incorporates herein by reference but points out that none of them, either alone or in combination, suggest the novel method and product which applicant has claimed.

| | |
|---|---|
| 3,546,930 | Flarsheim |
| 3,656,358 | Kopp |
| 4,905,533 | Benton et al |
| 4,938,090 | Brusasco |
| Canadian 671,403 | |

None of these patents suggest the pre-machining of separate attachment end components in standard configurations to provide the external bearing surfaces and drive attachment configurations which particular size ball screws require for the functions to be performed and the loads which they are to bear.

Other objects and advantages of the invention will be pointed out specifically or will become apparent from the following description when it is considered in conjunction with the appended claims and the accompanying drawings.

THE DRAWINGS

In the drawings, FIG. 1 is a schematic top plan view of a completed ball nut and screw assembly, showing it supported in the position in which an adhesive curing step can be performed, the nut being partly broken away to show the high precision bearing balls which recirculate in the nut.

FIG. 2 is a enlarged, fragmentary elevational view of one of the pre-machined attachment end components, the inboard portion of the end being partly broken away to illustrate the hardened adhesive key which is formed during the processing steps.

FIG. 3 is a still more enlarged, fragmentary view.

DETAILED DESCRIPTION

Figure 4:
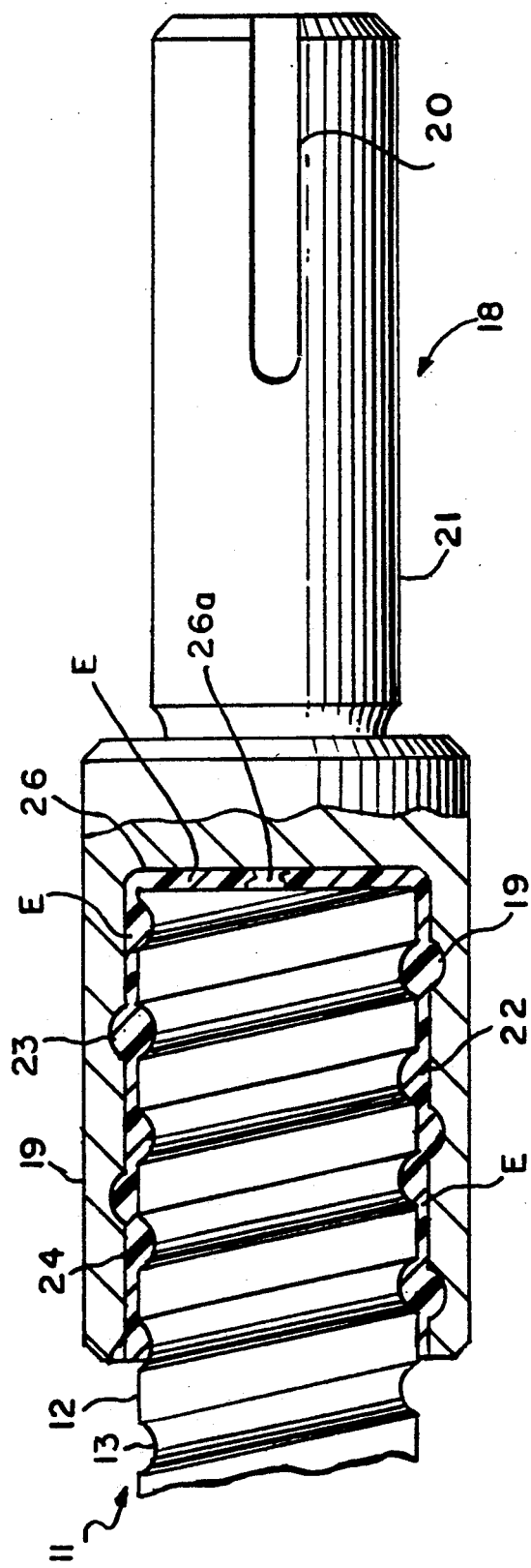
FIG. 4 is a fragmentary view of a modified construction similar to FIG. 2.

Referring now more particularly to the accompanying drawings, and in the first instance to FIG. 1, I have illustrated a ball nut, generally designated 10, mounted on a screw generally designated 11. The screw 11 is shown as having a continuous helical thread or land portion 12 bounded by a continuous helical groove 13 of semi-circular cross-section to provide a raceway for the balls 14 which permit relative rotation and translation of the nut 10 and screw 11. The ball nut 10 has a mating or complemental internal helical groove 15 of the same cross section and size, bounded by a helical land or thread 16 in the usual manner, and a ball return tube 16a which spans a number of turns of the helical groove 15 provides for ball recirculation. A clamp plate 17, secured by fasteners 17a, may be utilized to secure the ball return tube in position.

Provided at each end of the screw 11, is an initially separate, attachment end component, generally designated A, which may take any one of a number of standard configurations. As shown in FIG. 1, the attachment end A at the right end of the screw 11 comprises an outboard solid shaft end, generally designated 18, extending integrally from a sleeve 19. The outboard end 18 typically may have an axially extending slot or drive attachment configuration 20, permitting it to be coupled to an electric motor shaft (not shown) for driving the screw 11 in rotation. When this type of coupling configuration 20 is provided and the shaft 11 is driven, the nut 10 will be prevented from rotating with it and instead will be translated back and forth on the shaft 11 in the usual manner. The shaft 11, nut 10, and end components A are shown as formed of steel, as usual, to take the loads required.

Inboard of the coupling configuration 20 is a bearing surface 21 having a predetermined length and diameter. Internally, the sleeve 19 is provided with an internally threaded surface, generally designated 22, which comprises a continuous helical groove 23 separated by a continuous helical thread or land 24. The groove and land configuration 23-24 is identical to the groove and land configuration 12-13 of the screw 11, and provides a clearance generally designated 25 between the groove and land 12-13 of the screw 11 and the sleeve groove and land 23-24 as will be described. Provided to fill clearance 25, is a hardened, cured epoxy key E of helical configuration which both adhesively and mechanically joins each pre-machined end A to the shaft 11.

In FIG. 4 I have disclosed a modified structure in which like parts have received like numbers. The pitch of the helical groove 24 shown in FIG. 4 is considerably greater than the pitch of the helical groove 13 provided in the screw shaft 11. In this structure the helical land 23 provided on the interior wall of sleeve 19 does not interfit within the helical groove 13 of screw shaft 11 nor does the land 12 of the screw shaft 11 interfit within the helical groove 24 provided on the interior wall of sleeve 19. The circumferential key created by filling the substantial clearance between the helical groove 13 and the helical groove 24 is of a considerably enlarged character. Other than as stated, the product formed by the method to be described is identical to the product disclosed in FIGS. 1-3.

THE METHOD OF FORMING

Considering first of all the method of forming the asssembly disclosed in FIGS. 1-3 and assuming that the customer, at his place of business, has purchased a standard ball nut 10 and screw 11, and has obtained ends A from a stock of pre-machined ends of various standard sizes and configurations to produce a ball nut and screw assembly without ordering it as an assembled unit from the factory, it is merely necessary that the customer first cut the shaft to a desired length which considers the particular application and the loads which will be borne by the assembly. Thereafter, the nut 10 is threaded onto the end of shaft 11 until it reaches an interjacent position removed from the terminal ends of the shaft. Finally, the threads and lands 23-24 and the end cavity 26 are coated with a hardenable adhesive such as a liquefied epoxy resin E of the type described in U.S. Pat. Nos. 4,643,041 and 4,272,476. Epoxy resins are discussed in U.S. Pat. No. 4,017,453 and all of these patents are incorporated herein by reference. At the same time, the terminal ends of the screw 11 have their end faces, and lands and grooves 12-13, coated with the hardenable adhesive over the length of the screw ends which will be received by the sleeve portions 19. Before the adhesive sets, the attachment ends A are screwed onto the terminal ends of the screw shaft 11 to seat them in place in the manner indicated in FIGS. 1 and 2. Thereafter the screw shaft may be placed in V-blocks 27 which each have projecting pins 28 for engagement at spaced apart intervals with portions of the groove 13. It is in this manner that the epoxy E is cured, while the assembly is supported by the pins 28. While I have indicated that an epoxy adhesive may be used, other hardenable high strength adhesives may be used. The epoxy E or other high strength adhesive is applied such that all clearances, including end clearances 26a, are completely filled and a circumferential key extending from an end wall is formed when the epoxy cures or hardens.

Once the assembly is supported in the blocks 27, dial indicators can be used to check the outer diameters of the ends A relative to the ball circle diameter of the screw 11 for concentricity. If adjustment is required, the ends A can be repositioned as necessary by a light blow from a hammer, before the epoxy or other adhesive has fully set. Typically, the epoxy or other adhesive will cure at room temperature within one to two hours, depending on the particular adhesive used. If higher strength is required, the attachments A can also be drilled and pinned for added strength and higher torque applications, once the adhesive resin has fully cured.

The method of assembly described with respect to FIGS. 1-3 is followed exactly with regard to forming the modified structure disclosed in FIG. 4 except that the sleeve 19 is slipped over the end of the screw shaft rather than screwed into position.

While I have illustrated a ball screw and nut race device assembly in the drawings, it should be clear that I could also fashion a splined shaft assembly with a recirculating ball race device for splined shafts in the same way. Instead of providing a helical raceway, ball race devices for splined shafts commonly utilize end connected radially inner and outer linear races.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention which is defined in the following claims.

What is claimed is:

1. A recirculating ball nut and ball shaft assembly comprising:
   (a) a ball race device with internal land and ball receiving groove portions, and incorporating a recirculating ball circuit with balls;
   (b) a ball shaft of a predetermined axial length, with complemental groove and land portions for cooperatively receiving the balls, on which said ball race device is mounted interjacent the ends of the shaft, said groove and land portions of said shaft extending to at least one terminal end portion of the shaft;
   (c) a pre-machined end component of predetermined length having an outboard bearing surface, and a sleeve disposed axially over the at least one terminal end portion of the shaft and providing a clearance space between the sleeve and shaft;
   (d) and a hardened adhesive key disposed between the sleeve and the at least one terminal end portion of the shaft to adhesively and mechanically unite them.

2. The assembly of claim 1 wherein said sleeve terminates in an outboard end wall, and a clearance between the at least one terminal end portion of the shaft and the end wall of said sleeve is filled with a hardened adhesive.

3. The assembly of claim 1 wherein a second pre-machined shaft end component, having an external bearing surface and an attachment configuration, has an inboard sleeve with internal groove portions and land portions complemental to the groove and land portions of said shaft is disposed axially over the opposite terminal end of said shaft, there being a hardened adhesive key between the sleeve and shaft.

4. The assembly of claim 1 wherein said groove and land portions of said shaft are helical and said key is threaded.

5. A recirculating ball nut and ball shaft assembly comprising:
   (a) a ball race device with internal land and ball receiving groove portions, and incorporating a recirculating ball circuit with balls;
   (b) a ball shaft of a predetermined axial length, with complemental groove and land portions for cooperatively receiving the balls, on which said ball race device is mounted interjacent the ends of the shaft, said groove and land portions of said shaft extending to at least one terminal end portion of the shaft;
   (c) a pre-machined end component of predetermined length having an outboard bearing surface, and a sleeve disposed axially over the at least one terminal end portion of the shaft and providing peripheral clearance space between the sleeve and shaft;
   (d) and a hardened adhesive key disposed in said clearance space peripherally between the sleeve and the at least one terminal end portion of the shaft to adhesively and mechanically unite them.

6. The assembly of claim 5 wherein said sleeve has internal groove portions and said clearance space includes said sleeve groove portions and the groove portions of said shaft.

7. The assembly of claim 5 wherein said sleeve groove portions and shaft groove portions are helical.

8. The assembly of claim 7 wherein said sleeve has land portions between said sleeve groove portions mating with said shaft groove portions, and said sleeve groove portions mate with said shaft land portions, to permit said sleeve to be screwed into position.

* * * * *